United States Patent [19]

Simpson

[11] Patent Number: 5,043,078
[45] Date of Patent: Aug. 27, 1991

[54] WATER OXYGENATING AND PURIFYING METHOD

[76] Inventor: Bobby R. Simpson, 10072 Trask Ave., Garden Grove, Calif. 92083

[21] Appl. No.: 401,142

[22] Filed: Aug. 31, 1989

[51] Int. Cl.$^5$ ................................................ C02F 1/72
[52] U.S. Cl. .................................... 210/748; 210/758; 210/916
[58] Field of Search ............... 210/702, 716, 721, 724, 210/749, 748, 758, 903, 916

[56] References Cited

U.S. PATENT DOCUMENTS

| | | | |
|---|---|---|---|
| 3,816,306 | 6/1974 | Roy | 210/721 |
| 3,819,516 | 6/1974 | Murchison et al. | 210/763 |
| 4,251,486 | 2/1981 | Sohda | 210/252 |
| 4,695,378 | 9/1987 | Ackman et al. | 210/722 |

Primary Examiner—Peter Hruskoci
Assistant Examiner—Krisanne Shideler
Attorney, Agent, or Firm—Kenneth W. Float

[57] ABSTRACT

A solution useful in oxygenating and purifying water and other fluids is disclosed. The solution is comprised of water, sulfuric acid and sodium carbonate. The three components are mixed such that the pH of the solution is between 2 and 5. The active ingredients in the solution comprise approximately 6 percent of the solution. This solution is also sunlight activated, in that the solution acts to purify and oxygenate water to which it is added in an accelerated manner when exposed to sunlight. When added to water in which fish have been living, for example, which typically contains undesirable quantities of nitrates and nitrites which poison the fish, the present solution produces such substances as ammonium sulfide, ammonium carbonate and hydrogen sulfide, which are removed from the solution by precipitation and evaporation. The solution may be added to salt or fresh water in a ratio of from 16 ounces to 32 ounces per 100 gallons to oxygenate the water in which fish are living without killing the fish. This solution may be added to sewer water or other toxic solution in a much stronger dosage to oxygenate and purify the toxic water. Ammonium and hydrogen sulfides precipitate from the solution when it is added to the sewer or mine waste water, and these assist in the formation of aerobic bacteria. In addition to oxygenation, this solution clears up the water color by decreasing turbidity, and it removes odors from the water.

14 Claims, No Drawings

WATER OXYGENATING AND PURIFYING METHOD

BACKGROUND

The present invention relates generally to chemical solutions, and more particularly to a solution that oxygenates and purifies water and other fluids.

By way of background, the fishing industry has a practice of shipping fish over long distances in salt water containers, or in plastic bags, for example. Typically, the fish are able to survive on the order of four days in such containers due to the fact that oxygen in the water is depleted. In addition, over time, the water in which the fish are confined becomes turbid and contains substantial amounts of unwanted nitrates and nitrites. These unwanted chemicals also reduce the life expectancy of the fish. Consequently there has been a need for a substance or water soluble species that can be added to the water in which the fish are transported that will prolong their lives during transit.

In addition, sewer water and mine waste water have long been a health hazard having noxious odors that are generally toxic, undesirable and unpleasant at best. Consequently there has been a need for a substance or water soluble species that can be added to the sewer and mine waste water that would remove the odors from the water, purify the water, and generally make the water more tolerable and less toxic.

SUMMARY OF THE INVENTION

In order to meet the needs outlined above, the present invention provides for a water oxygenating and purifying solution that comprises water, sulfuric acid and sodium carbonate, also known as sodium carbonate mono. The water forms a carrier for the solution and is not employed for the purpose of providing oxygen. The water acts as a buffer as does the sodium carbonate. The solution is mixed such that its pH is between about 2 and 5. The solution operates well with a pH of about 4 and is highly active with a pH of about 2. Typically, the active (non-water) ingredients in the solution typically comprise approximately 6 percent of the solution. The components of the solution are conventionally mixed in terms of mole weights, a practice well-known in the chemical industry. The solution so formed is a highly oxygenated solution. This solution may be termed a hyperviolet compound for the purposes of description. This solution is also sunlight activated, in that the solution acts to purify and oxygenate water to which it is added in an accelerated manner when exposed to sunlight.

When added to water in which fish have been living, which typically contains undesirable quantities of nitrates and nitrites which poison the fish, the present solution interacts with the water and produces such substances as ammonium sulfide, ammonium carbonate and hydrogen sulfide. These substances are removed from the solution by precipitation and evaporation, for example.

A method of oxygenating and purifying water in accordance with the principles of the present invention comprises the following steps. Preparing a solution comprising water, sulfuric acid and sodium carbonate and having a pH in the range of from 2 to 5. This solution is then added to salt or fresh water in a ratio of from 16 ounces to 32 ounces per 100 gallons in order to oxygenate and purify the water in which fish are living without killing the fish. This solution is may be added to sewer water or other toxic solution in a much stronger dosage in order to oxygenate and purify this toxic water.

In addition to oxygenation, the present solution clears up the water color, its turbidity is decreased, and it removes odors from the water. The solution has particular use in prolonging the life of fish shipped over long distances in fresh or salt water containers or plastic bags, for example. In particular, in experimental tests performed to date, use of the present invention has allowed fish to live in plastic bags on the order of two weeks, whereas, conventional shipping in fresh or salt water allows the fish to live only about four days.

The solution, when added to sewer or mine waste water, removes odors therefrom and breaks down hazardous chemical substances contained therein. This renders the sewer or mine waste water less toxic. Certain chemical substances are formed, including (a) ammonium nitrates and nitrites that precipitate from the solution when added to the sewer or mine waste water, and these assist in the formation of aerobic bacteria, and (b) hydrogen sulfides that bubble off as gas.

DETAILED DESCRIPTION

The various features and advantages of the present invention may be more readily understood with reference to the following detailed description of the present invention. The water soluble species of the present invention comprises the following solution: water, sulfuric acid and sodium carbonate (also known as sodium monocarbonate). Without subscribing to any particular theory, it appears that the negative sulfate and carbonate ions are associated in some fashion, together with the positive hydrogen and sodium ions, to form a water soluble species. The solution is mixed such that its pH is between about 2 and 5. The solution operates well with a pH of about 4 and is highly active with a pH of about 2. The water into which the other chemicals are added provides a carrier for the reaction that frees up oxygen in the solution. The water forms a carrier for the solution and is not employed for the purpose of providing oxygen. The water acts as a buffer as does the sodium carbonate.

By way of example, the following steps may be performed to make a solution in accordance with the principles of the present invention. First one gallon of tap water is placed in a suitable glass container. This water typically meets and is specified by drinking water standards. Then, 200 milliliters of sulfuric acid ($H_2SO_4$) is then added to the water. The sulfuric acid is a 90 percent solution. Then, 1000 milliliters of sodium carbonate mono ($NaCO_3$) is then added to the solution of sulfuric acid and water. This solution is then adjusted to have a pH of about 2 to 5. To achieve this, sodium carbonate is added to to adjust the pH of the solution to the desired value within the 2 to 5 range. This mixture provides for a solution which may be called a hyperviolet compound weighing approximately 8.5 pounds per gallon and having a nominal pH of about 4. One gallon of the hyperviolet compound has a specific gravity of approximately 1.010 and a pH of about 5 at 20° C.

Typically, the active ingredients in the solution comprise approximately 6 percent thereof. The components of the solution are conventionally mixed in terms of mole weights, a practice well-known in the chemical industry. This solution is also sunlight activated, in that the solution acts to purify and oxygenate water to which it is added in an accelerated manner when exposed to sunlight.

Fresh or salt water in which fish have been living typically contains undesirable quantities of nitrates and nitrites which poison the fish. The present solution may then be added to the water which will result in oxygenation thereof. The present solution interacts with the water and produces such substances as ammonium sulfide, ammonium carbonate and hydrogen sulfide. These substances are removed from the solution by precipitation and bubbling off, or outgasing, for example.

The present solution, when added to water that is to be oxygenated, for example, breaks down ammonia and ammonium nitrates and nitrites contained in the water. It is believed that the present solution reacts with carbon dioxide in the water to produce free oxygen. Ammonium sulfate, for example, precipitates out of the water to the bottom of the tank. Hydrogen sulfide gas bubbles from the surface of the water. As a result of the above reactions, the water is oxygenated, the turbidity of the water is decreased and odors are removed from the water. Consequently, the present solution may be employed to treat sewer water, for example. By dumping a quantity of the present solution into sewer water, the water is deodorized, bacteria digesting substances are produced that precipitate out of the formed solution which freshen the sewer water and hence treat it to make it less toxic.

A method of oxygenating and purifying water in accordance with the principles of the present invention comprises the following steps. Preparing a solution comprising water, sulfuric acid and sodium carbonate. This solution is then added to salt or fresh water, or sewer or other toxic solution in order to oxygenate and purify the water.

In addition to oxygenation, the present solution clears up the water color, its turbidity is decreased, and it removes odors from the water. The solution has particular use in prolonging the life of fish shipped over long distances in fresh or salt water containers or plastic bags, for example. In particular, in experimental tests performed to date, use of the present invention has allowed fish to live in plastic bags on the order of two weeks, whereas, conventional shipping in fresh or salt water allows the fish to live only about four days.

The solution, when added to sewer or mine waste water, removes odors therefrom and breaks down hazardous chemical substances contained therein. This renders the sewer or mine waste water less toxic. Certain chemical substances are formed, including (a) ammonium nitrates and nitrites that precipitate from the solution when added to the sewer or mine waste water, and these assist in the formation of aerobic bacteria, and (b) hydrogen sulfides that bubble off as gases.

Thus there has been described a new and improved solution that oxygenates and purifies water and that deodorizes sewer water and makes it less toxic. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A method of oxygenating water containing, said method comprising the steps of:

preparing a solution comprising water, sulfuric acid and sodium carbonate;

adjusting the ratio of the sulfuric acid to sodium carbonate to provide a solution with a pH in the range of about 2 to 5; and adding the prepared solution to water containing nitrates and nitrites that is to be oxygenated;

wherein said ratio is sufficient in the water containing nitrates and nitrites to release oxygen, thereby oxygenating the water.

2. The method of claim 1 which further comprises the step of:

exposing the water containing the prepared solution to sunlight to accelerate the oxygenation process.

3. The method of claim 2 which further comprises the step of:

adding the solution to salt or fresh water in a ratio of from about 16 ounces to about 32 ounces per 100 gallons in order to oxygenate the water.

4. The method of claim 1 wherein the step of adjusting the ratio of the sulfuric acid to sodium carbonate comprises adjusting the ratio to provide a solution with a pH of about 4.

5. The method of claim 4 wherein the solution comprises about a 6 percent solution, wherein sulfuric acid and sodium carbonate comprise about 6 percent thereof.

6. The method of claim 5 which further comprises the step of:

adding the solution to salt or fresh water in a ratio of from about 16 ounces to about 32 ounces per 100 gallons in order to oxygenate the water.

7. The method of claim 4 which further comprises the step of:

adding the solution to salt or fresh water in a ratio of from about 16 ounces to about 32 ounces per 100 gallons in order to oxygenate the water.

8. The method of claim 1 wherein the solution comprises about a 6 percent solution, wherein sulfuric acid and sodium carbonate comprise about 6 percent thereof.

9. The method of claim 8 which further comprises the step of:

adding the solution to salt or fresh water in a ratio of from about 16 ounces to about 32 ounces per 100 gallons in order to oxygenate the water.

10. The method of claim 1 which further comprises the step of:

adding the solution to salt or fresh water in a ratio of from about 16 ounces to about 32 ounces per 100 gallons in order to oxygenate the water.

11. A method of oxygenating water in which fish are transported and in which nitrates and nitrites are present, said method comprising the steps of:

preparing a solution comprising water, sulfuric acid and sodium carbonate;

adjusting the ratio of the sulfuric acid to sodium carbonate to provide a solution with a pH in the range of about 2 to 5; and adding the prepared solution to water in which fish are transported and in which nitrates and nitrites are present;

wherein said ratio is sufficient in the water containing nitrates and nitrites to release oxygen, thereby oxygenating the water in which the fish are transported.

12. A method of oxygenating mine waste water in which nitrates and nitrites are present, said method comprising the steps of:

preparing a solution comprising water, sulfuric acid and sodium carbonate;

adjusting the ratio of the sulfuric acid to sodium carbonate to provide a solution with a pH in the range of about 2 to 5; and adding the prepared solution to mine waste water in which nitrates and nitrites are present;

wherein said ratio is sufficient in the mine waste water containing nitrates and nitrites to release oxygen, thereby oxygenating the mine waste water.

13. A method of oxygenating water that is contaminated with nitrates and nitrites, said method comprising the steps of:

preparing a solution comprising water, sulfuric acid and sodium carbonate;

adjusting the ratio of the sulfuric acid to sodium carbonate to provide a solution with a predetermined pH; and adding the prepared solution to water that is contaminated with nitrates and nitrites that is to be oxygenated;

wherein said ratio is sufficient in the water that is contaminated with nitrates and nitrites to release oxygen, thereby oxygenating the water.

14. A method of oxygenating waste water in which nitrates and nitrites are present, said method comprising the steps of:

preparing a solution comprising water, sulfuric acid and sodium carbonate;

adjusting the ratio of the sulfuric acid to sodium carbonate to provide a solution with a predetermined pH; and adding the prepared solution to waste water in which nitrates and nitrites are present;

wherein said ratio is sufficient in the water containing nitrates and nitrites to release oxygen, thereby oxygenating the water.

* * * * *